US008849696B2

(12) United States Patent
Pansari et al.

(10) Patent No.: US 8,849,696 B2
(45) Date of Patent: *Sep. 30, 2014

(54) MONETIZING SERVICE CALLS THROUGH ADVERTISING

(75) Inventors: Ambar Pansari, San Francisco, CA (US); Jessica R. Ewing, San Francisco, CA (US)

(73) Assignee: Google Inc., Mountain View, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/526,000

(22) Filed: Jun. 18, 2012

(65) Prior Publication Data

US 2012/0314853 A1 Dec. 13, 2012

Related U.S. Application Data

(63) Continuation of application No. 11/394,197, filed on Mar. 31, 2006, now Pat. No. 8,224,695.

(51) Int. Cl.
| | |
|---|---|
| *H04M 15/00* | (2006.01) |
| *H04M 3/42* | (2006.01) |
| *G06Q 30/00* | (2012.01) |
| *G06Q 30/02* | (2012.01) |

(52) U.S. Cl.
CPC .......... *G06Q 30/02* (2013.01); *G06Q 30/0214* (2013.01); *G06Q 30/0211* (2013.01)
USPC ..... 705/14.13; 370/259; 370/352; 379/88.17; 379/114.01; 379/114.13; 379/207.16; 379/219; 455/67.11; 455/406; 455/414.3; 455/466; 704/10; 705/1.1; 705/14.16; 705/14.49; 705/73

(58) Field of Classification Search
CPC .......... G06Q 30/0226; G06Q 30/0214; G06Q 30/0277; G06Q 30/0211; G06Q 30/0224; G06Q 30/0235
USPC .................. 705/14.13, 14.16, 1.1, 14.49, 73; 379/88.17, 114.01, 114.13, 207.16, 379/219; 455/414.3, 406, 67.11, 466; 370/259, 352; 704/10
See application file for complete search history.

(56) References Cited

U.S. PATENT DOCUMENTS

| | | |
|---|---|---|
| 5,690,409 A | 11/1997 | Boebel |
| 5,708,780 A | 1/1998 | Levergood et al. |
| 5,751,956 A | 5/1998 | Kirsch |
| 5,809,242 A | 9/1998 | Shaw et al. |
| 5,819,285 A | 10/1998 | Damico et al. |

(Continued)

FOREIGN PATENT DOCUMENTS

| | | |
|---|---|---|
| JP | 2001-195248 | 7/2001 |
| JP | 2003-216872 | 7/2003 |

(Continued)

OTHER PUBLICATIONS

Zinman et al., "LinkMarket Business Plan", Jun. 6, 1995, 24 pages.

(Continued)

*Primary Examiner* — Gerald Gauthier
(74) *Attorney, Agent, or Firm* — Harrity & Harrity, LLP

(57) ABSTRACT

A platform service that is used by an application may be linked to an advertising service. A cost of using the platform service may be reduced based on the linking.

20 Claims, 8 Drawing Sheets

(56) References Cited

U.S. PATENT DOCUMENTS

| | | | |
|---|---|---|---|
| 5,855,008 A | 12/1998 | Goldhaber et al. | |
| 5,948,061 A | 9/1999 | Merriman et al. | |
| 6,256,739 B1 | 7/2001 | Skopp et al. | |
| 6,557,054 B2 | 4/2003 | Reisman | |
| 6,567,854 B1 | 5/2003 | Olshansky et al. | |
| 6,754,470 B2* | 6/2004 | Hendrickson et al. | 455/67.11 |
| 7,010,112 B2* | 3/2006 | Lee et al. | 379/207.16 |
| 7,068,995 B1 | 6/2006 | Geddes et al. | |
| 7,124,115 B1 | 10/2006 | Herzberg et al. | |
| 7,227,942 B2* | 6/2007 | Deo et al. | 379/219 |
| 7,346,545 B2 | 3/2008 | Jones | |
| 7,421,155 B2 | 9/2008 | King et al. | |
| 7,660,581 B2 | 2/2010 | Ramer et al. | |
| 8,219,153 B2* | 7/2012 | Gil et al. | 455/566 |
| 8,223,955 B2* | 7/2012 | Pounds et al. | 379/265.09 |
| 8,224,695 B2* | 7/2012 | Pansari et al. | 705/14.13 |
| 8,285,337 B1* | 10/2012 | Gil et al. | 455/566 |
| 8,320,878 B2* | 11/2012 | Vakil et al. | 455/406 |
| 2001/0056374 A1 | 12/2001 | Joao | |
| 2002/0164962 A1 | 11/2002 | Mankins et al. | |
| 2003/0028529 A1 | 2/2003 | Cheung et al. | |
| 2004/0107137 A1 | 6/2004 | Skinner | |
| 2004/0107139 A1* | 6/2004 | Shibanuma | 705/14 |
| 2004/0267610 A1* | 12/2004 | Gossett et al. | 705/14 |
| 2005/0149390 A1 | 7/2005 | Scholl et al. | |
| 2006/0047579 A1 | 3/2006 | Dresden | |
| 2006/0168664 A1 | 7/2006 | Frank et al. | |
| 2006/0259294 A1* | 11/2006 | Tashereau | 704/10 |
| 2007/0042760 A1 | 2/2007 | Roth | |
| 2007/0265858 A1* | 11/2007 | Pansari et al. | 705/1 |
| 2008/0071619 A1* | 3/2008 | Charlton et al. | 705/14 |
| 2008/0092158 A1 | 4/2008 | Bhatnagar et al. | |
| 2008/0155588 A1 | 6/2008 | Roberts et al. | |
| 2008/0287096 A1 | 11/2008 | Aaltonen et al. | |
| 2009/0259547 A1* | 10/2009 | Clopp | 705/14.16 |
| 2010/0094878 A1 | 4/2010 | Soroca et al. | |
| 2010/0262475 A1* | 10/2010 | Gavriline et al. | 705/14.13 |
| 2010/0268597 A1* | 10/2010 | Bookstaff | 705/14.49 |
| 2010/0332304 A1* | 12/2010 | Higgins et al. | 705/14.16 |
| 2011/0016482 A1 | 1/2011 | Tidwell et al. | |
| 2011/0093320 A1 | 4/2011 | Blake et al. | |
| 2011/0153433 A1 | 6/2011 | Rosenberger | |
| 2011/0238501 A1* | 9/2011 | Almeida | 705/14.56 |
| 2012/0123839 A1* | 5/2012 | Blake et al. | 705/14.16 |
| 2012/0314853 A1* | 12/2012 | Pansari et al. | 379/114.13 |
| 2013/0013422 A1* | 1/2013 | Altberg et al. | 705/14.71 |
| 2013/0124345 A1* | 5/2013 | Pen | 705/14.73 |
| 2013/0262240 A1* | 10/2013 | Altberg et al. | 705/14.71 |

FOREIGN PATENT DOCUMENTS

| | | |
|---|---|---|
| JP | 2003-333636 | 11/2003 |
| JP | 2003-337893 | 11/2003 |
| JP | 2004-287610 | 10/2004 |
| KR | 2001-0091862 | 10/2004 |

OTHER PUBLICATIONS

Jason Strober, "Microsoft ads through FocaLink", Nov. 21, 1995, 1 page.

Jennifer Ratner, "Saturn Reports", Dec. 5, 1995, 3 pages.

Michael Wang, "Intel Report Nov. 27, 1995-Dec. 3, 1995", Dec. 12, 1995, 15 pages.

Focalink Communications, Inc., "Web Site Rates", Mar. 14, 1996, 26 pages.

Business Wire, "Major Companies, Ad Agencies Using New Internet Ad Server: Focalink's SmartBanner Enables Cost-Effective Marketing on the Web", Feb. 5, 1996, 2 pages.

Jason Strober, Proposal to Intel, Nov. 13, 1995, 4 pages.

"Declaration Under 37 C.F.R. §1.132 of Dwight A. Merriman" filed with the USPTO on Feb. 9, 2001, 10 pages.

Google, Inc., "Google's Preliminary Invalidity Contentions", Jun. 26, 2009, 12 pages.

Exhibits A and B filed with Google's Preliminary Invalidity Contentions on Jun. 26, 2009, 60 pages.

Jason Strober, "Web Site Pricing Draft", Nov. 7, 1995, 1 page.

Amazon.com Amazon Web Services Store: Amazon Web Services, "$ Make Money, I have something to sell", website: http://www.amazon.com/gp/browse.html/002-7480740-3981659?node=3309511, printed on Jun. 28, 2006, pp. 1-13.

Tap into the eBay Platform—eBay Developers Program, "Develop Today!", website: http://developer.ebay.com/index_html, printed on Jun. 28, 2006, p. 1.

International Search Report and Written Opinion dated Oct. 31, 2007, 8 total pages.

International Preliminary Report on Patentability issued for corresponding international application No. PCT/US2007/065662, mailed Oct. 31, 2007, 6 pages.

\* cited by examiner

MONETIZING SERVICE CALLS THROUGH ADVERTISING

RELATED APPLICATION

This application is a Continuation of U.S. patent application Ser. No. 11/394,197, filed Mar. 31, 2006 now U.S. Pat. No. 8,224,695, the contents of which are incorporated herein by reference.

FIELD OF THE INVENTION

Implementations consistent with the principles of the invention relate generally to communication systems and, more particularly, to monetizing calls to a platform service through advertising.

BACKGROUND OF THE INVENTION

Developers of desktop and network-based applications may incorporate services, such as e-mail services, mapping services, search services, etc., into their applications that are provided by a third party. Two common approaches to providing a service to an application developer include: charging the application developer a per-transaction fee for the use of the service, and making the service completely free to the application developer. Problems exist in both of these approaches.

For example, charging the application developer a per-transaction fee for using the service holds back the application developer from even creating the application, since no developer wants to get stuck with fees they cannot pay; forces the application developer to think about money before user experience; and causes the application developer to be fully committed to the business model, making the barriers for participation very high. In the second approach (where the service is completely free to the application developer), there are no clear or obvious incentives for the application developer to efficiently use the third party's services towards a goal that is in line with the third party. Moreover, application developers can create applications that only have a very tangential relationship to the third party's business, and the third party foots the entire bill for the backend infrastructure since, again, the services are free.

SUMMARY OF THE INVENTION

In accordance with one implementation consistent with the principles of the invention, a method may include tracking, for an application that provides at least one advertising link and uses a platform service, a number of times that the at least one advertising link is selected over a period of time, where the application is associated with a first party and the platform service is associated with a second party. The method may further include providing an amount of free access to the platform service to the first party based on the tracking.

In another implementation consistent with the principles of the invention, a method may include tracking, for a document that provides at least one advertising link and uses a platform service, a number of times that the at least one advertising link is selected over a period of time, where the document is associated with a first party and the platform service is associated with a second party. The method may further include providing a monetary value to the first party based on the tracking.

In yet another implementation consistent with the principles of the invention, a method may include linking, for an application, a use of a platform service to an advertising service; and reducing a cost of using the platform service based on the linking.

In still another implementation consistent with the principles of the invention, a method may include charging a party a fee for allowing a document that is associated with a first party to use a service associated with a second party; providing, via the second party, an advertising link to the document when the document is accessed; tracking activity relating to the advertising link; and providing a monetary value to the first party based on the tracking.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Systems and methods consistent with the principles of the invention provide application developers with incentives for providing advertising in their applications. Developers may create web-based or desktop applications based on a service provided by a third party. For example, a developer may create a desktop application using a service, such as a network search service, a mapping service, an e-mail service, or another service that is provided by a third party. The backend infrastructure for the service may be provided by the third party as a set of web service application programming interfaces (APIs) exposed by the third party.

Implementations consistent with the principles of the invention provide a new business model, backed up with a set of web services, developer tools, and backend infrastructure to allow those who develop and publish software (both web-based and desktop) to monetize their work through targeted advertising. In one implementation consistent with the principles of the invention, the developer's usage of a third-party service is linked together with an advertising service provided by the third party. As the developer's application generates clicks by showing advertising in their application, the developer is granted "credits" by the third party to make service calls to the service provided by the third party. More clicks and more revenue mean more credits, keeping the usage of the service essentially free for the developer.

Figure 1:
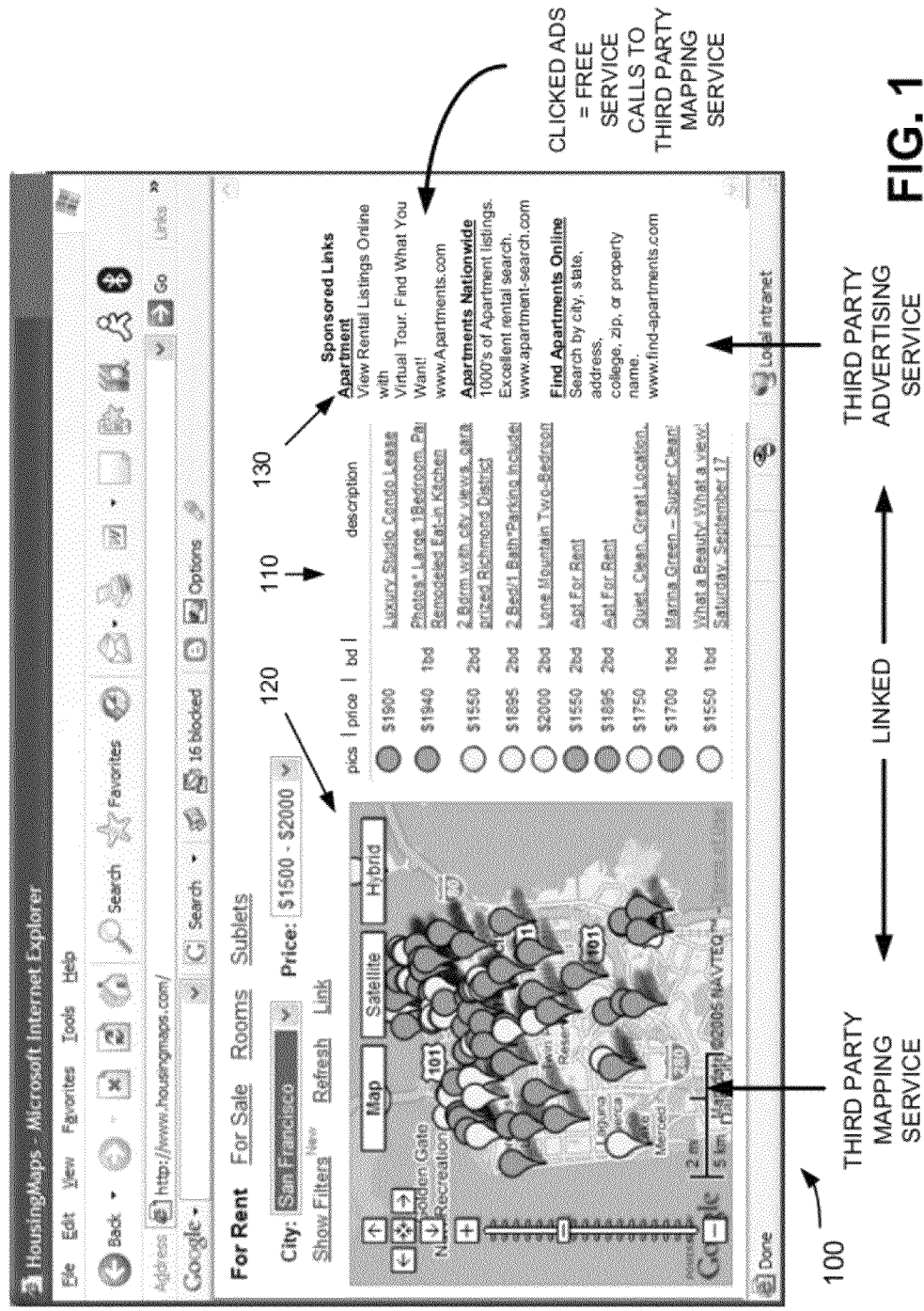
FIG. 1 is a diagram illustrating an exemplary concept consistent with the principles of the invention.

FIG. 1 is a diagram illustrating an exemplary concept consistent with the principles of the invention. Assume that a developer created an application 100 that provides apartment-hunting information. As illustrated, application 100 may include an available apartment listings section 110, a map section 120, and an advertising section 130. Apartment listing section 110 may provide a list of available apartments in the area of interest to a user of application 100. Map section 120 provides a map that depicts the location of the apartments in apartment listings section 110. Assume that map section 120 is provided based on a service call to a third party that provides maps. Advertising section 130 may provide advertising links that relate to the content of application 100. In this situation, advertising section 130 may provide advertising links that relate to finding apartments. Advertising section 130 may also be provided by the third party.

In FIG. 1, application 100 links the third party's mapping service (which provides information to map section 120) to the third party's advertising service (which provides advertising links for advertising section 130). In one implementation consistent with the principles of the invention, as users click on displayed advertising links, the developer may be provided with free service calls to mapping service 120.

By linking together the usage of a service (e.g., search, maps, etc.) with the usage of an advertising service, the incentives of the third party and the developer become aligned. This linking provides stronger incentives for the developer to create innovative applications, to use the third party's services, and to monetize through advertising. The linking also gives the third party a stronger incentive to provide such services to developers since it increases the third party's revenue potential while decreasing the prohibitive costs associated with providing and supporting such services.

Exemplary Network Configuration

Figure 2:
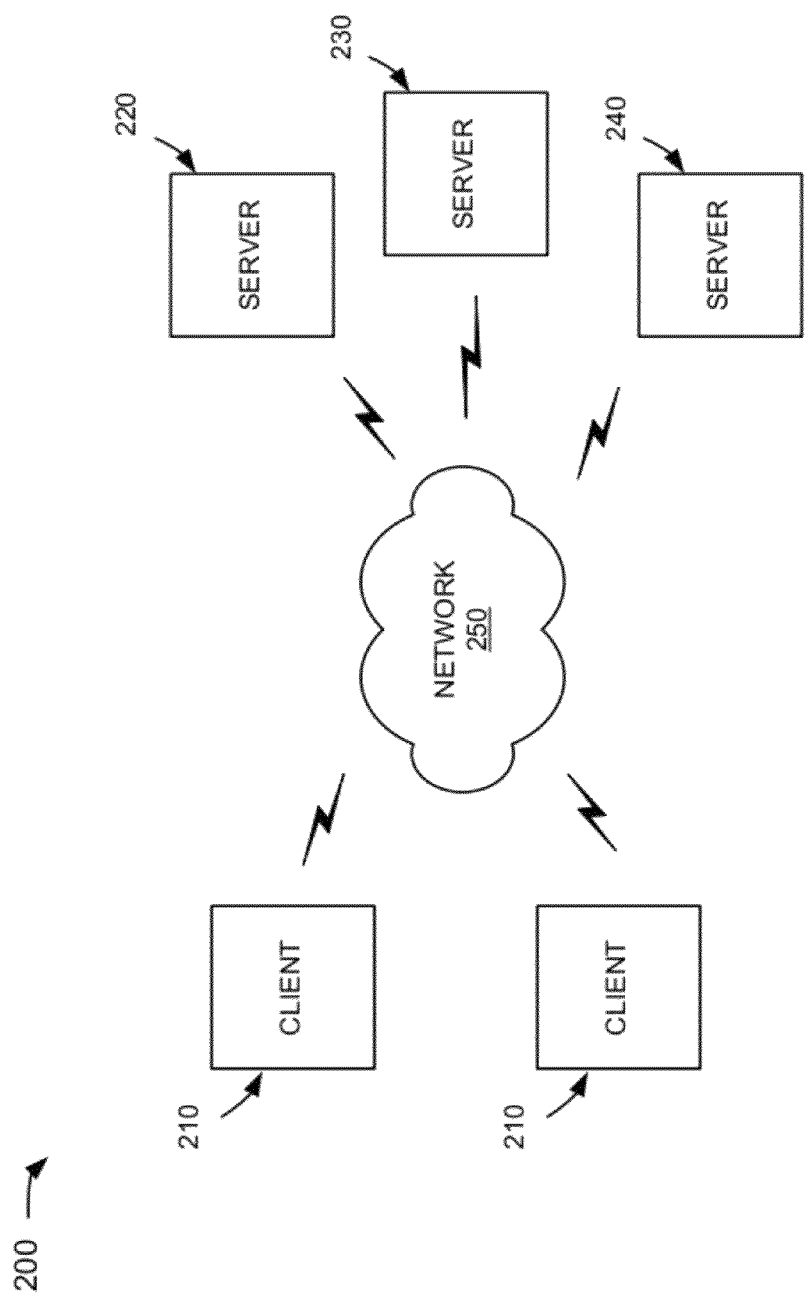
FIG. 2 is a diagram of an exemplary network in which systems and methods consistent with the principles of the invention may be implemented.

FIG. 2 is a diagram of an exemplary network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

While servers 220-240 are shown as separate entities, it may be possible for one or more of servers 220-240 to perform one or more of the functions of another one or more of servers 220-240. For example, it may be possible that two or more of servers 220-240 are implemented as a single server.

It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, another type of network, or a combination of networks. Clients 210 and servers 220-240 may connect to network 250 via wired, wireless, and/or optical connections.

Exemplary Client/Server Architecture

Figure 3:
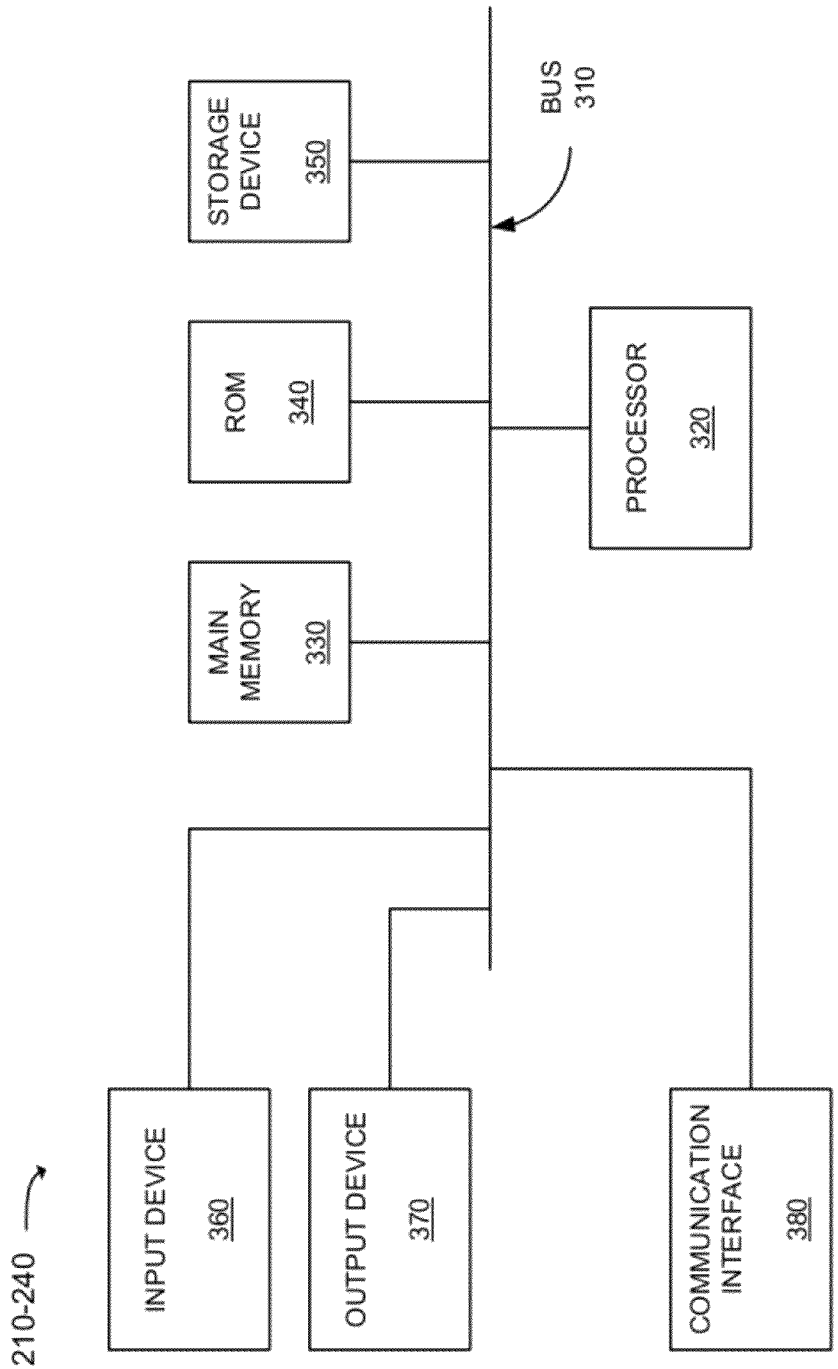
FIG. 3 is a diagram of an exemplary client or server entity in an implementation consistent with the principles of the invention.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
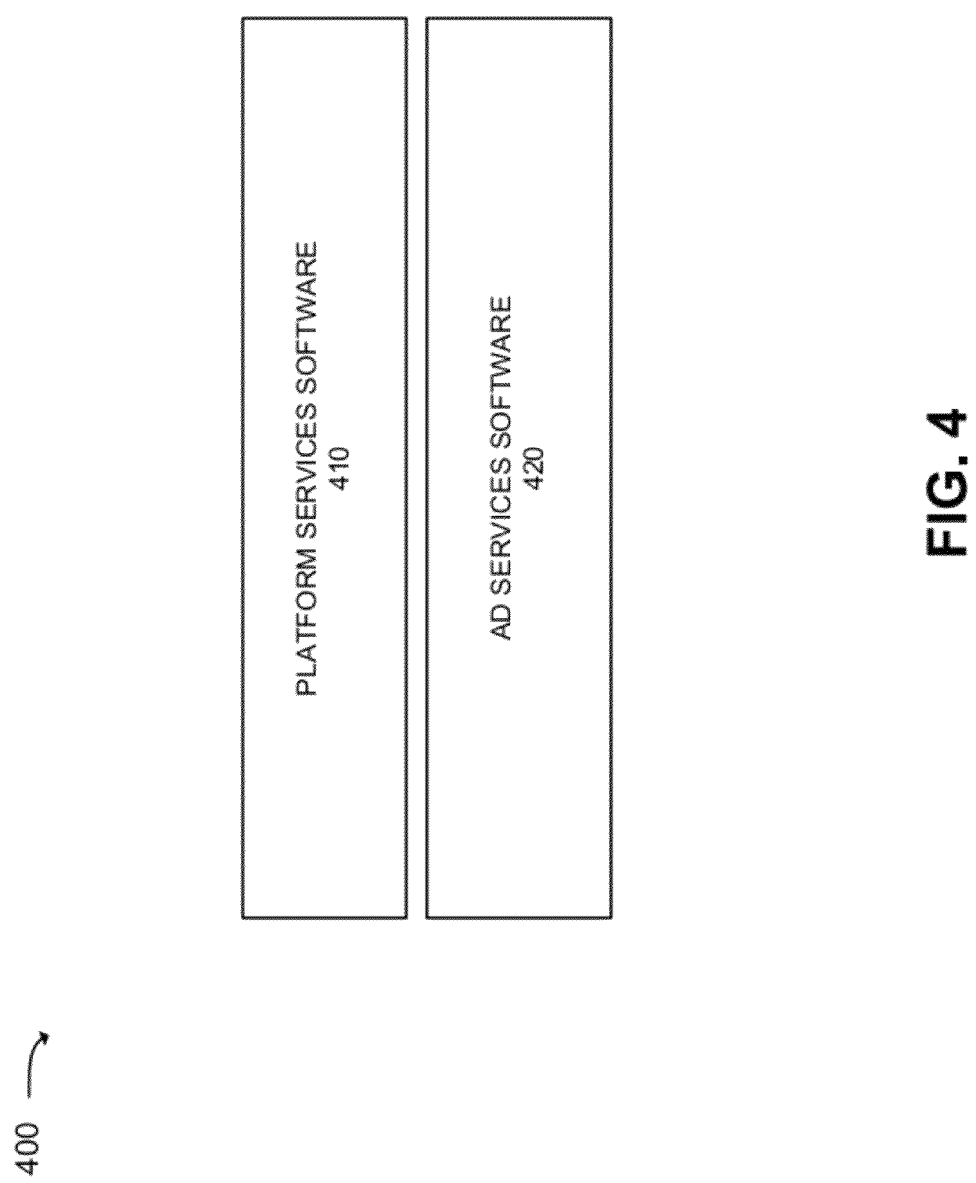
FIG. 4 is a diagram of a portion of an exemplary computer-readable medium that may be used by the server of FIG. 2.

FIG. 4 is a diagram of a portion of an exemplary computer-readable medium 400 that may be used by a server, such as server 220. In one implementation, computer-readable medium 400 may correspond to memory 330 of server 220. In other implementations, computer-readable medium 400 may correspond to a number of memories in one or a number of different servers. The portion of computer-readable medium 400 illustrated in FIG. 4 may include platform services software 410 and advertisement (AD) services software 420.

Platform services software 410 may include software for interfacing with services provided by a third party. For example, the services may include search services, mapping services, e-mail services, and/or other types of services that may be used in an application. Advertisement services software 420 may include software for providing advertising links. Advertisement services software 420 may, in one implementation consistent with the principles of the invention, provide advertising links based on the content of the application to which the advertising links will be provided. For example, if the application to which the advertising links are to be provided relates to finding apartments, advertisement services software 420 may select and provide advertising links relating to finding apartments.

Developing an Application

Figure 5:
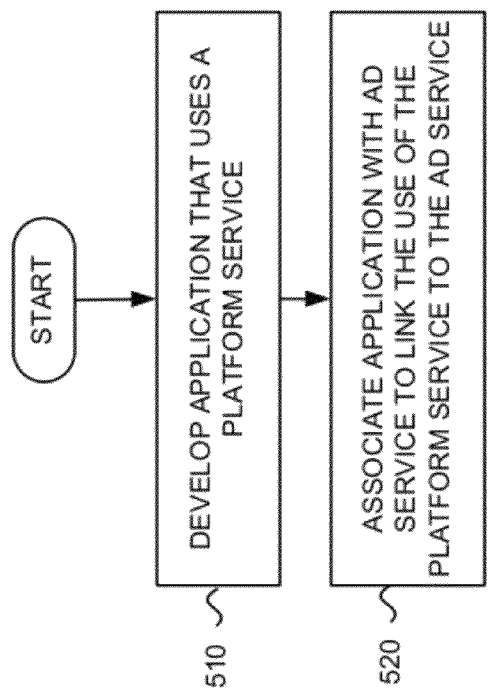
FIG. 5 is a flow chart of an exemplary process for developing an application in an implementation consistent with the principles of the invention.

FIG. 5 is a flow chart of an exemplary process for developing an application in an implementation consistent with the principles of the invention. Processing may begin with a developer creating an application that uses a platform service provided by a third party (act 510). The application may include, for example, a web-based application or a desktop application. The platform service may include, for example, a search service, a mapping service, an e-mail service, or other types of services. The developer may create the application using, for example, developer tools provided by the third party (or another party).

The application may be linked to an advertisement service (act 520). The advertisement service may also be provided by the third party. Linking the platform service to the advertisement service allows for advertisements to be provided to users accessing the application. FIG. 1 illustrates an exemplary application 100 that may be created by a developer in which a platform service (a mapping service) associated with a third party is linked to an advertising service that is also associated with the third party. The linking of the platform service to the advertising service for the application may be performed, for example, via software code within the application (e.g., the software code may cause advertising links to be retrieved and displayed when the application is accessed by a user).

Providing Incentives to Application Developer

Figure 6:
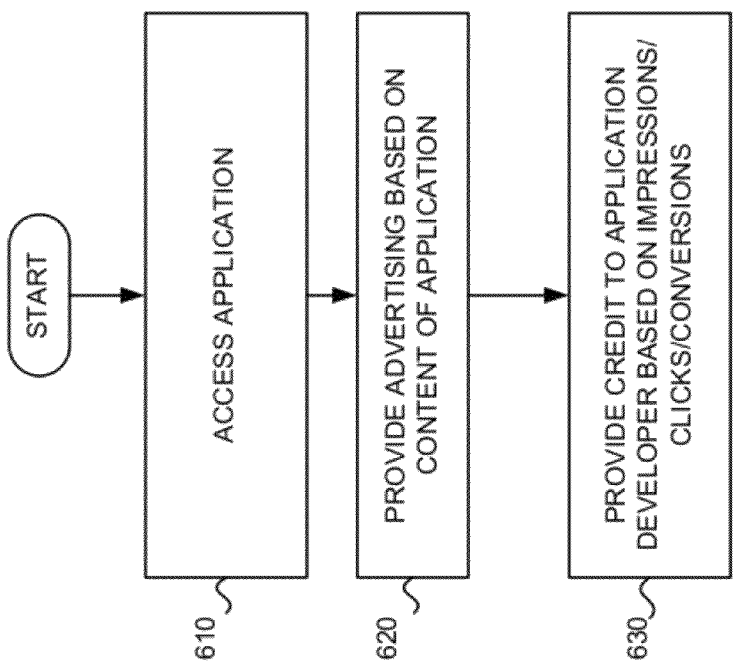
FIG. 6 is a flow chart of an exemplary process for providing incentives for developers in an implementation consistent with the principles of the invention.

FIG. 6 is a flow chart of an exemplary process for providing incentives for developers in an implementation consistent with the principles of the invention. Processing may begin with a user accessing an application (act 610). To access the application, the user may, for example, double-click an icon on his/her desktop or access a document, such as a web page, by, for example, entering a uniform resource locator (URL) into his/her web browser.

It is assumed herein that the application uses a platform service, such as a mapping service, provided by a third party, and an advertisement service that is also provided by the third party. To use the platform service, the application may transmit a service call to the mapping service (or an application programming interface of the mapping service). The service call may request, for example, that the mapping service provide a specific map to the application. In the situation where the platform service includes an e-mail service, the service call may request, for example, that the e-mail service provide e-mails for a specific account (e.g., the e-mail account associated with the user) to the application. In the situation where the platform service includes a search service, the service call may request, for example, that the search service perform a search based on a search query provided by the user and return the results of the search to the application.

One or more advertising links may be provided to the application for display to the user (act 620). In one implementation consistent with the principles of the invention, upon activation of the application, the application may send a request to the advertisement service for advertising links. The advertisement service may select advertising links based on the content of the application. For example, if the application provides apartment locator information (as in the example illustrated in FIG. 1), the advertisement service may select advertising links that relate to locating apartments.

Credit may be provided to the application developer based on the provided advertising links (act 630). It is assumed herein that the application developer and the owner of the application are the same entity. When the application developer and owner of the application are different entities, it will be appreciated that the credit may be provided to the owner of the application.

The third party (or another party) may track activity associated with the advertising links over a period of time and provide credit to the application developer based on the amount of activity. For example, credit may be provided to the application developer based on advertising link impressions, clicks, and/or conversions. An "impression" refers to the display of advertising links to a user of the application. When a particular advertising link is of interest to a user, the user may select (or click) the advertising link, which may cause the user's web browser to visit a web page belonging to the advertiser associated with the advertising link. This selection of an advertising link by a user is referred to hereinafter as a "click." In addition, an advertising link may be provided to a user (i.e., an impression), and then the user may perform a certain action, such as providing information relating to the user, purchasing a good or service, joining a group or activity, providing permission for certain actions by the advertiser or another party, or the like. This action by the user is referred to hereinafter as a "conversion." Thus, the third party may provide credit to the application developer each time that advertising links are displayed to a user of the application, each time a user selects a displayed advertising link, and/or each time a user performs a conversion in relation to an advertising link.

The amount of credit provided by the third party may be configurable. For example, the third party may determine that a first number of credits should be provided to the application developer when an advertising link is displayed, a second, higher number of credits should be provided to the application developer when an advertising link is clicked, and a third, even higher number of credits should be provided to the application developer for each conversion. Other ways of determining an amount of credit to provide to the application developer are also possible.

There are a number of ways in which credit may be provided to the application developer. For example, the third party may provide the application developer with a predetermined number of service calls to the platform service for a period of time. If the actual number of service calls during the period of time exceeds the predetermined number, the third party may charge the application developer a fee for service calls over the predetermined number. The third party may increase the predetermined number in response to user advertising-related activity. For example, the third party may increase the predetermined number in response to advertising link impressions, clicks of displayed advertising links, and/or conversions. Thus, as the developer's application generates more impressions/clicks/conversions, the application's use of the platform service becomes essentially free for the developer.

As an alternative to (or in addition to) providing an increased number of free service calls to the application developer for impressions/clicks/conversions, the third party may provide true monetary incentives to the application developer for impressions/clicks/conversions. For example, the third party may charge the application developer a variable monthly fee for service calls to the platform service. The third party may then refund some money as impressions/clicks/conversions are generated. Alternatively, the third party may charge the application developer a fixed fee for using the platform service. The third party may then refund some money as impressions/clicks/conversions are generated. In both situations, the developer's cost for accessing the platform service may be drastically reduced (even to zero) once usage of the developer's application is high enough.

EXAMPLE

Figure 7A:
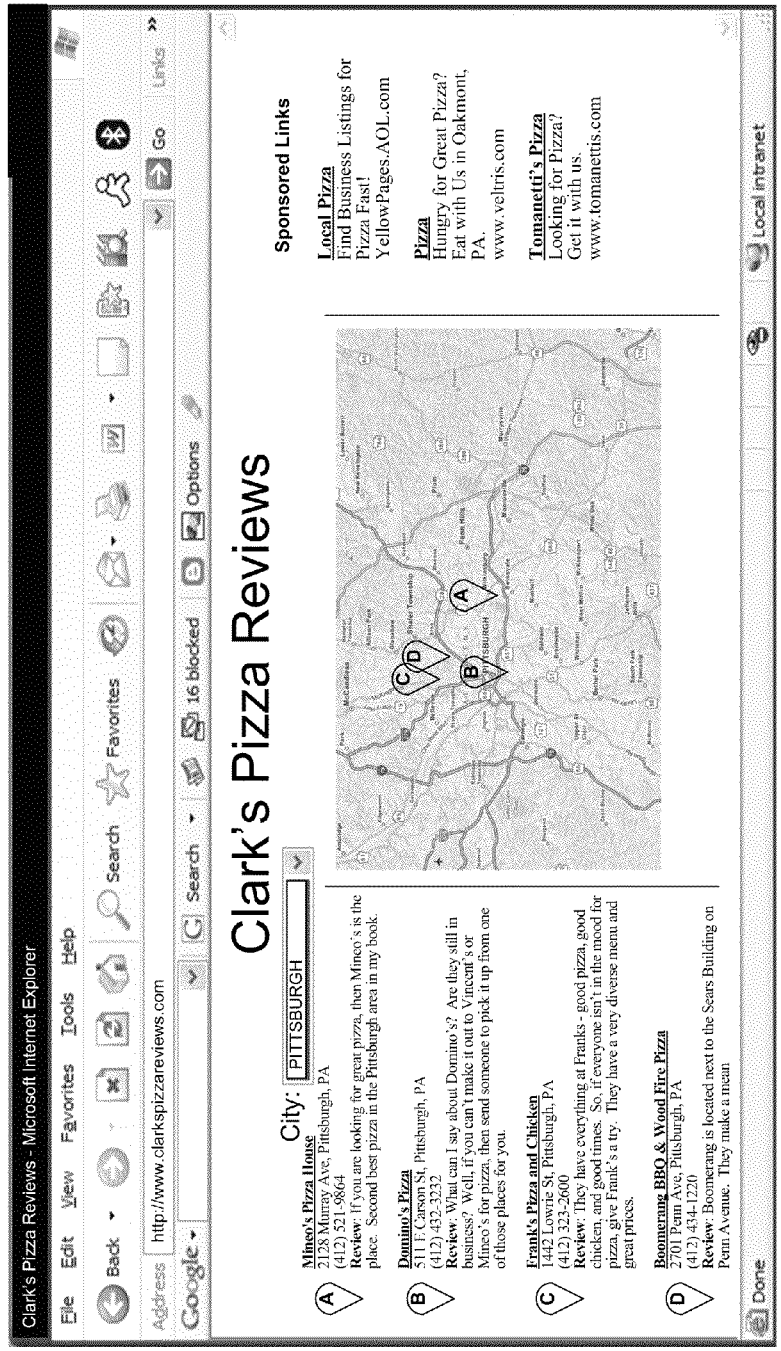
FIGS. 7A and 7B provide, in an implementation consistent with the principles of the invention, an example of the processing described with respect to FIGS. 5 and 6.

The following example illustrates the above processing. In this example, assume, as illustrated in FIG. 7A, that a developer created an application 700 that provides reviews for pizza establishments. As illustrated, application 700 may provide individual reviews of pizza establishments in an area of interest (Pittsburgh in the example illustrated in FIG. 7A). Application 700 also provides a map from a third party's mapping service that shows the location of the pizza establishments for which reviews are provided. In order to reduce the cost of using the third party's mapping service, the developer may link the use of the third party's mapping service to an advertisement service provided by the third party (act 710). Thus, the developer's interests are aligned with the third party's interests. The developer benefits from providing the third party's advertisements by reducing the cost of using the third party's mapping service. The third party benefits from providing advertisements in the developer's application through advertisement revenues.

Once application 700 is developed, it may be provided to users (act 720). For example, if application 700 is a desktop application, it may be provided to users via the Internet (e.g., via a download) and then installed and executed by the users. If application 700 is a web-based application, it may, for example, be provided to users in response to the users accessing a particular document (e.g., web page).

Figure 7B:
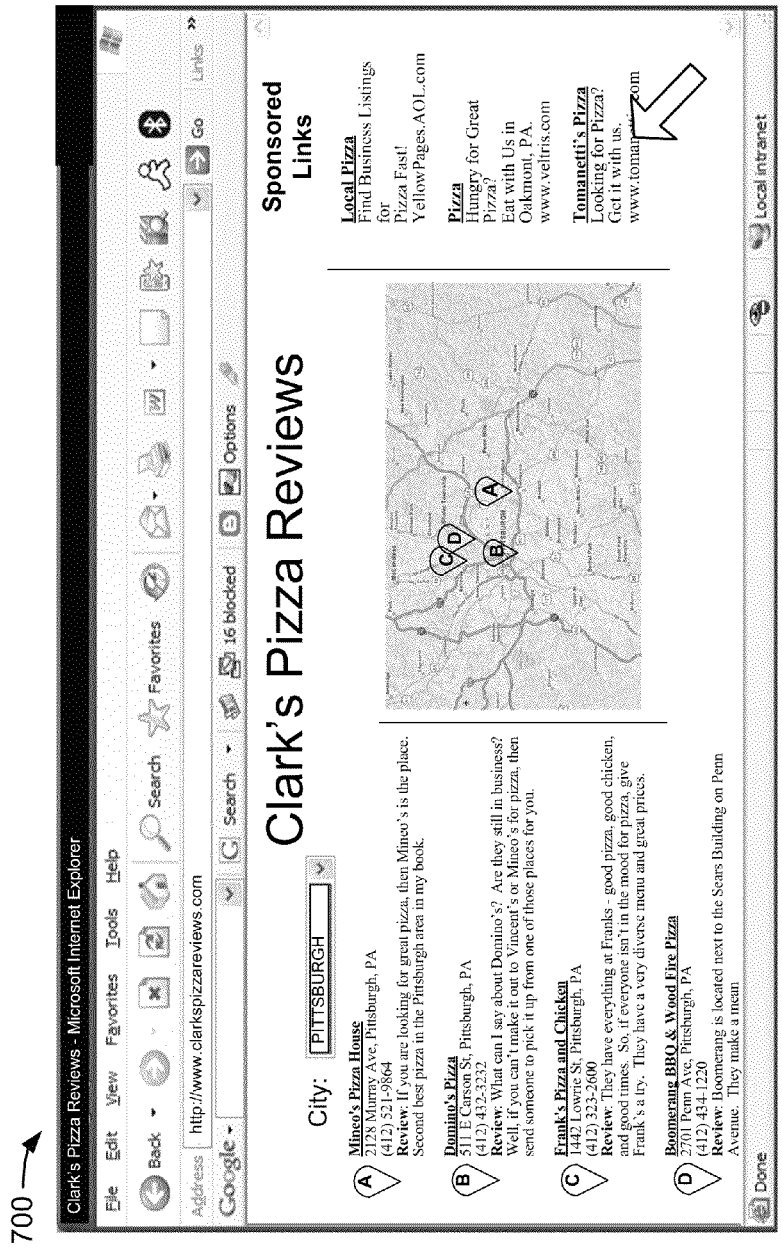

In any event, when users access application 700, advertising links may be provided that relate to the content of application 700, which, in this example, is pizza establishments. The third party may track the user's interaction with application 700. For example, the third party may track the identity of the advertisements that are provided to users, which advertisements have been clicked, and/or the number of conversions that occurred (act 730, FIG. 7B). The third party may provide the application developer with credits (e.g., free service calls to the mapping service and/or monetary payouts) based on the number of advertising impressions, clicks, and/or conversions (act 740).

As indicated above, the linking of a third party's platform service calls to the third party's advertisement service keeps the application developer's incentives aligned with the incentives of the third party. For example, the developer is interested in developing a valuable and practical application with a great user experience, in which users are interested, thereby generating demand for the application; and providing advertising in his/her application and generating useful impressions/clicks/conversions that ultimately raise the limit of free service calls to the third party's platform services, allowing the application to continue to grow, for free, using the third party's backend infrastructure. The third party is interested in providing compelling, useful, well-documented, supported platform services (including APIs) that developers can use to build great desktop and web-based applications; providing easy-to-use, yet powerful advertising APIs that developers can use to quickly integrate targeted advertising into their applications; sharing revenue from the advertising with the developer; and providing continued free access to the third party's platform services for successful, powerful, useful applications that users love and demand.

CONCLUSION

Systems and methods consistent with the principles of the invention link the use of platform services with the use of advertising services, providing application developers with incentives for providing advertising in their applications.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5 and 6, the order of the acts may be modified in other implementations consistent with the principles of the invention. Further, non-dependent acts may be performed in parallel.

The preceding description refers to a user. A "user" is intended to refer to a client, such as a client 210 (FIG. 2), or an operator of a client.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    enabling, via one or more processors in one or more server devices, a first application code to access a second application code associated with providing a platform service to users via the first application code, the first application code being associated with a first
party, and
the second application code and the platform service
being associated with a second party that differs from
the first party,
the first party being charged a fee, by the second party,
for use, by the users, of the platform service via the
first application code;
associating, by the one or more processors in the one or
more server devices, the use, by the users, of the platform service via the first application code with an advertising service,
the first application code causing an advertisement
received from the advertising service to be displayed
to the users, and
the advertisement being related to:
a content of the first application code, and
the second party;
tracking, by the one or more processors in the one or more
server devices and over a period of time, interaction, by
the users, with the advertisement;
calculating, by the one or more processors in the one or
more server devices, a quantity of credits to be provided
to the first party based on the interaction;
reducing, by the one or more processors in the one or more
server devices, the fee charged to the first party for the
use, by the users, of the platform service via the first
application code based on a first portion of the quantity
of credits,
the first portion of the quantity of credits corresponding
to the fee charged to the first party for the use, by the
users, of the platform service via the first application
code; and
storing, by the one or more processors in the one or more
server devices, information identifying a second portion
of the quantity of credits.

2. The method of claim 1, where the platform service associated with the second application code includes at least one of a mapping service, an e-mail service, or a search service.

3. The method of claim 1, further comprising:
providing, for display and based on associating the use, by
the users, of the platform service via the first application
code with the advertising service, an advertising link
when the first application code is accessed by the users.

4. The method of claim 3, where tracking the interaction includes:
tracking information associated with at least one of:
a quantity of times that the advertising link is selected,
through the first application code, by the users,
a quantity of times that the advertising link is provided
for display, or
a quantity of conversions associated with the advertising
link; and
where calculating the quantity of credits includes:
calculating the quantity of credits based on the information.

5. The method of claim 1, where tracking the interaction includes:
tracking information associated with at least one of:
a quantity of times that the advertisement is selected,
through the first application code, by the users,
a quantity of times that the advertisement is provided for
display, or
a quantity of conversions associated with the advertisement; and
where calculating the quantity of credits includes:
calculating the quantity of credits based on the information.

6. The method of claim 1, where the first application code is related to a desktop application, and
where the platform service includes a mapping service.

7. A method comprising:
enabling, via one or more processors in at least one server
device, users to access, through a first application code,
a platform service provided by a second application
code,
the first application code being associated with a first
party, and
the platform service being associated with a second
party that differs from the first party,
the users being different from the first party and the
second party;
charging, by the one or more processors in the at least one
server device, a fee to the first party, for access by the
users and through the first application code, to the second application code providing the platform service,
the second party providing an advertising link to the first
application code when the first application code is
accessed by the users;
tracking, by the one or more processors in the at least one
server device, activity relating to the advertising link;
calculating, by the one or more processors in the at least
one server device, a quantity of credits associated with
the first party based on tracking the activity;
reducing, by the one or more processors in the at least one
server device, the fee based on a first portion of the
quantity of credits,
the first portion of the quantity of credits corresponding
to the fee; and
providing, by the one or more processors in the at least one
server device, a monetary value from the second party to
the first party based on the a second portion of the quantity of credits.

8. The method of claim 7, where the fee includes a fixed fee for allowing the first application code to use the platform service for a period of time.

9. The method of claim 7, where the fee is based on a quantity of uses of the platform service by the users.

10. The method of claim 7, where the first application code is related to a network-based application.

11. The method of claim 7, where the platform service includes at least one of a mapping service, an e-mail service, or a search service.

12. The method of claim 7, where tracking the activity includes:
tracking a quantity of times that the advertising link is
selected by the users.

13. The method of claim 7, where tracking the activity includes:
tracking a quantity of times that the advertising link is
provided for display, through the first application code,
to the users.

14. A non-transitory computer-readable memory comprising:
one or more instructions which, when executed by one or
more processors, cause the one or more processors to:
enable users to access, through a first application code, a
platform service provided by a second application
code,
the first application code being associated with a first
party, the platform service being associated with a second party that is different from the first party, the first party being charged a fee by the second party for using the platform service, and the users being different from the first party and the second party;

charge the fee to the first party, for access, over a period of time, by the users and through the first application code to the second application code providing the platform service, the second party providing an advertising link to the first application code when the platform service is accessed by the users;

track activity relating to the advertising link;

calculate a quantity of credits to be provided to the first party based on tracking the activity;

reduce the fee charged to the first party based on a first portion of the quantity of credits, the first portion of the quantity of credits corresponding to the fee charged to the first party; and provide a monetary value from the second party to the first party based on a second portion of the quantity of credits.

15. The non-transitory computer-readable memory of claim 14, where the fee includes:

a fixed fee for allowing the first application code to use the platform service over the period of time, or a calculated fee is based on a quantity of uses of the platform service by the first application code.

16. The non-transitory computer-readable memory of claim 14, where the first application code is related to a desktop application.

17. The non-transitory computer-readable memory of claim 14, where the platform service includes at least one of a mapping service, an e-mail service, or a search service.

18. The non-transitory computer-readable memory of claim 14, where the one more instructions, when causing the one or more processors to track the activity relating to the advertising link, further cause the one or more processors to:

track a quantity of times that the advertising link is selected by the users.

19. The non-transitory computer-readable memory of claim 14, where the one more instructions, when causing the one or more processors to track the activity relating to the advertising link, further cause the one or more processors to:

track a quantity of times that the advertising link is provided for display, through the first application code, to the users.

20. The non-transitory computer-readable memory of claim 14, where the one more instructions, when causing the one or more processors to track the activity relating to the advertising link, further cause the one or more processors to:

track a quantity of conversions associated with the advertising link.

* * * * *